Oct. 20, 1936.  I. WOLFF  2,058,283
AUTOMOBILE BUMPER
Original Filed June 10, 1933   3 Sheets-Sheet 3
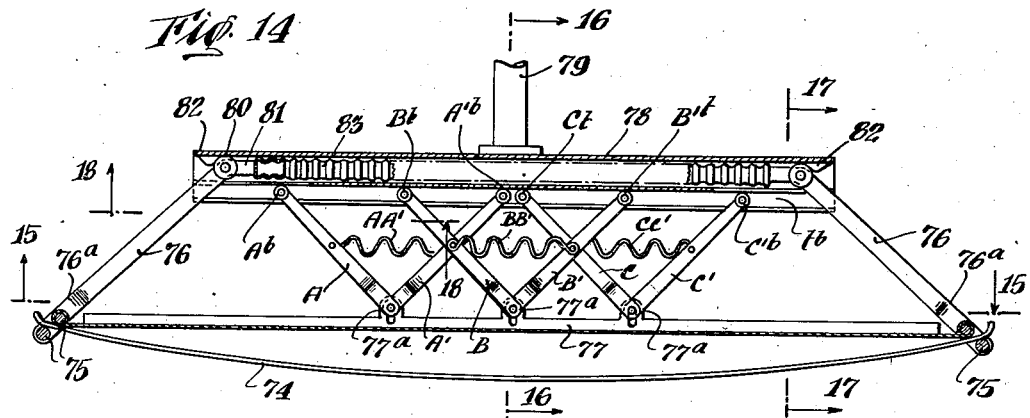
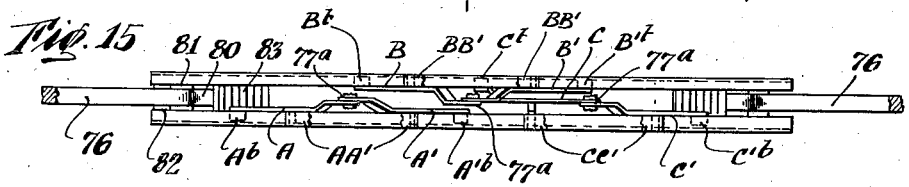
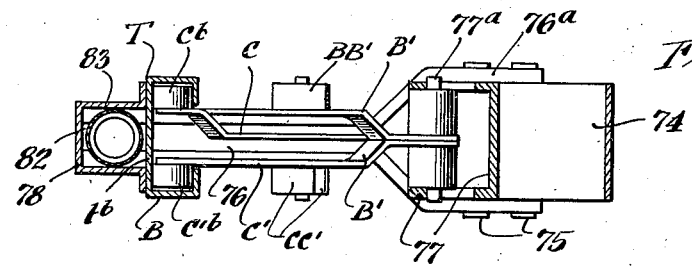
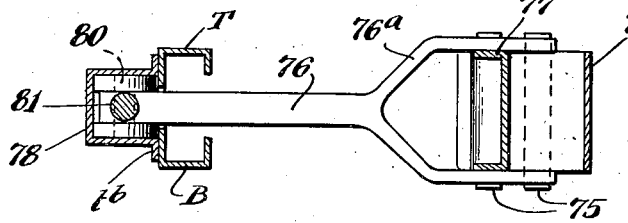
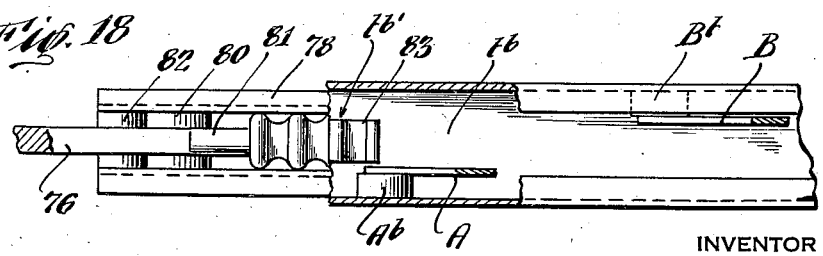
INVENTOR
*Ivan Wolff*
BY
*Augustus M. Henry*
ATTORNEY Patented Oct. 20, 1936

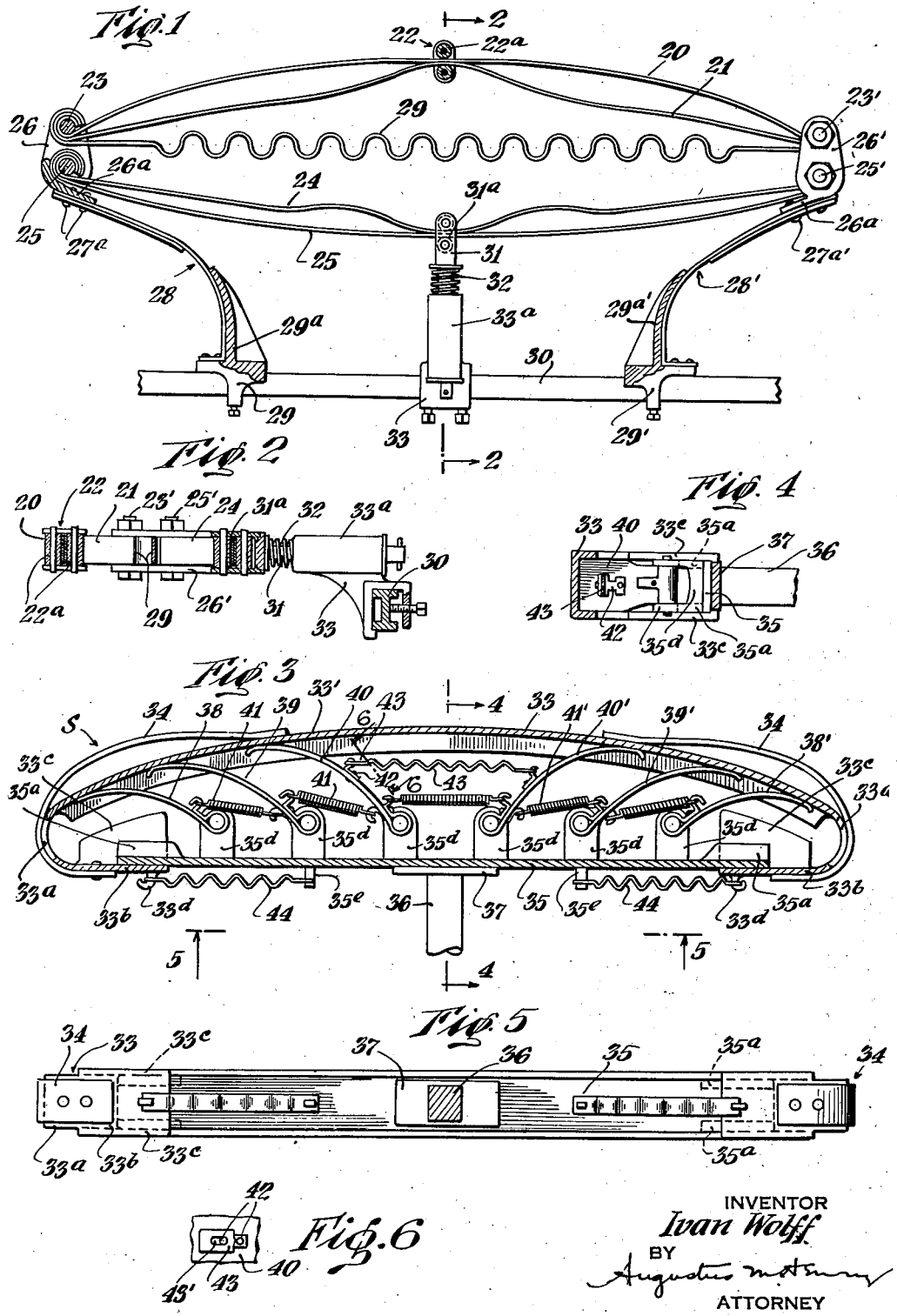

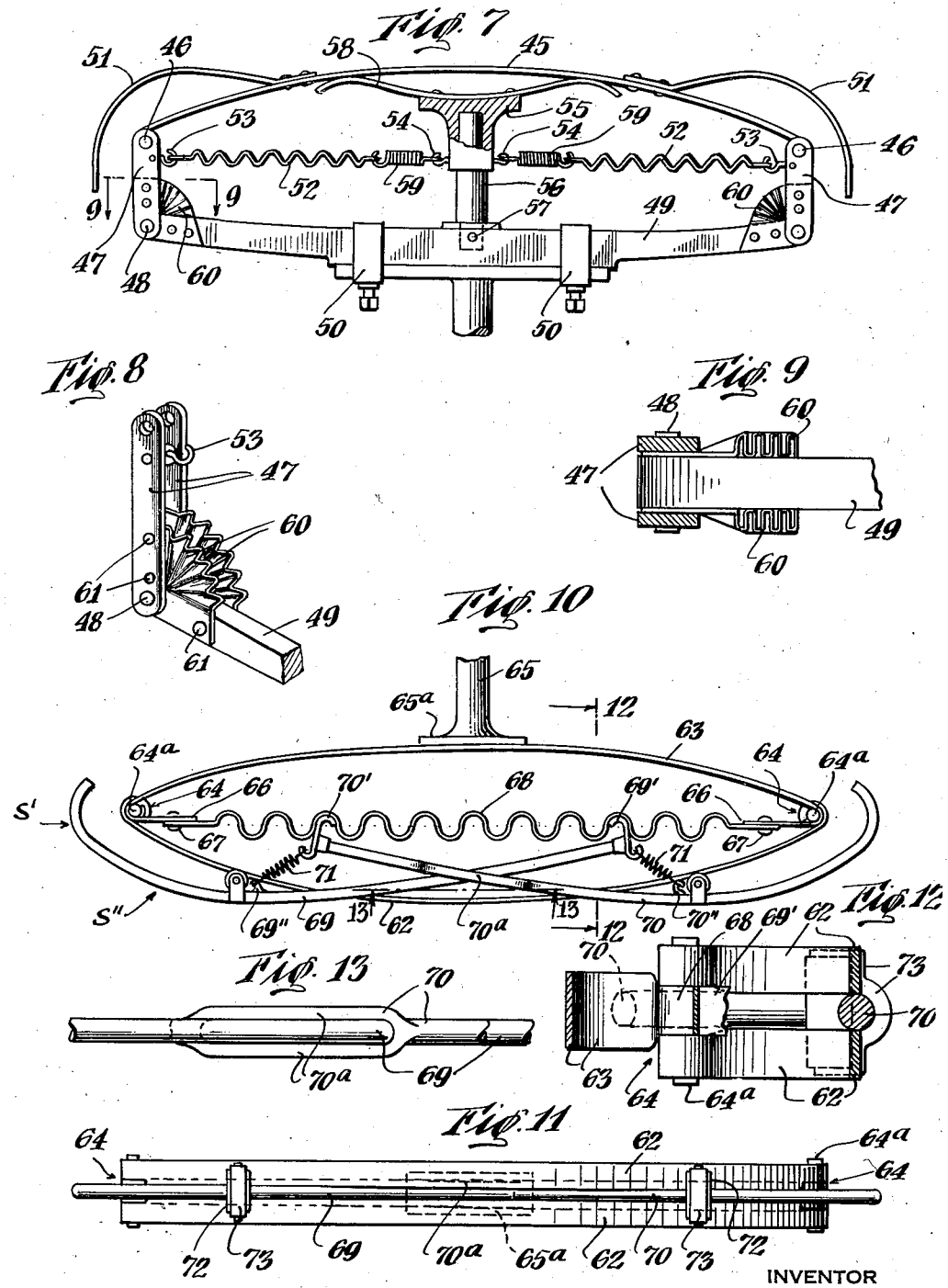

2,058,283

UNITED STATES PATENT OFFICE 2,058,283

AUTOMOBILE BUMPER

Ivan Wolff, New York, N. Y.

Application June 10, 1933, Serial No. 675,165
Renewed March 30, 1936

23 Claims. (Cl. 293—55)

This invention relates to that class of devices, commonly known as bumpers, carried at the front and rear or both ends of automotive vehicles for use as protective and shock-absorbing fenders or buffers.

Such bumpers as heretofore proposed have generally included impact elements in the form of fairly stiff bands extending across the front or back of the vehicle and usually incurved at opposite ends toward the chassis side-bars. Such bands are usually of spring steel and rather massive to withstand permanent distortion or crushing on the occurrence of a severe collision shock while slightly resiliently yielding to absorb such shock as much as possible. In attempts to soften the absorptive reaction, mountings often of the arched leaf-spring type wherein the leaf or other spring elements are thinner and more elastically flexible than the impact bar or bars, have been resorted to. In some cases, such leaf-spring mountings, whether individual elongate elements or mere continuations of other elongate elements making up the bumper, have been specially shaped, and given special dispositions in relation to an impact band e. g., placed behind an impact band, or between an impact band at the outer end of the bumper and what may be called a secondary band or bar behind the impact band last mentioned; with the avowed purpose of providing a better cushioning and smoother absorption of a frontal shock or with the avowed purpose of having the bumper exhibit improved behavior in resisting and cushioning shocks received laterally or obliquely of the center line of the vehicle.

However, in all prior constructions of which I am aware, including those mentioned just above, any frontal or substantially frontal shock is necessarily received by the bumper in such a way that the disruptive and destructive effect of such shock is transmitted wholly or mainly or at least considerably in a direction parallel to the center line of the vehicle, that is, in the direction of its travel. In other words, the shock absorbing efficiency (such as it is) of all bumpers heretofore proposed substantially wholly resides in the fact that distortion of the bumper elements produces, primarily if not entirely, a collapsing of the general structure of the bumper toward the vehicle. Thus the present-day bumper, whether stiff and comparatively unyielding or the opposite, constitutes an ever present potentiality for imposing a racking strain on the vehicle and giving serious injury to the vehicle occupants.

One of the objects of the present invention is to provide a bumper which upon collision with any other object will absorb the shock (wholly, mainly or at least considerably) widthwisely of the vehicle, that is, lengthwisely of the bumper, even when the bumper and the colliding object meet in such manner as to subject the bumper to frontal shock.

This object is attained according to the invention by providing a bumper which upon receiving a shock from collision with an object external to the vehicle acts automatically to distend itself widthwisely of the vehicle, or to shift a bumper part widthwisely of the vehicle; thereby to cause a redisposition or reshaping of a part or parts of the bumper in a manner to absorb a considerable part of the shock received by the bumper but in a direction sometimes (that is, in the case of a frontal or substantially frontal impact) at a considerable angle to the direction of shock reception. Such a construction for the first time makes it feasible to incorporate in the bumper shock-absorber elements which can perform shock absorbingly by linear distention and/or by crushing or compacting linearly; and such a construction, also, when desired, makes it possible for the first time practicably to incorporate in the bumper (since a bumper is very much longer than deep) a series of progressively deformable shock-absorbing means of gradually increasing resistivity to deformation.

Another object of the invention is to provide a bumper incorporating a shock-absorbing means which performs shock-absorbingly by distention and/or collapse with such distention or collapse resulting in a permanent deformation of said means, as contradistinguished from merely a reshaping or redisposition thereof which is elastically overcome upon relief of the reshaping or redisposing strain.

Another object of the invention is to provide a bumper incorporating a shock-absorbing means which, whether a unitary member or a built-up multi-part structure, acts shock-absorbingly by distention and/or contraction linearly or along a substantially straight line lengthwisely or substantially lengthwisely of the bumper.

Another object of the invention is to provide in a bumper of greater width than depth a shock-absorbing means which includes a plurality of shock-absorbing instrumentalities progressively permanently and/or elastically deformable in a direction at a less angle to the depth than to the width of the bumper.

Another object of the invention is to provide a bumper which upon receiving either an oblique or a frontal shock will absorb such shock by transmitting the same largely to an element yieldable transversely or substantially transversely of the vehicle.

The invention will be more clearly understood, and the various objects and advantages thereof including those already mentioned will be fully appreciated, from the following description of certain now preferred of the many possible embodiments of the invention.

These embodiments, which are merely illustrative of course, are shown in the accompanying drawings, in which Fig. 1 is a view showing one embodiment, principally in top plan but partially broken away and partially in section;

Fig. 2 is a vertical section on line 2—2 of Fig. 1, looking toward the right in Fig. 1;

Fig. 3 is a view similar to Fig. 1, but showing another embodiment;

Fig. 4 is a vertical section, taken on the line 4—4 of Fig. 3;

Fig. 5 is a vertical section, taken on the line 5—5 of Fig. 3;

Fig. 6 is a detail view, being also a vertical section, this taken on the line 6—6 of Fig. 3;

Fig. 7 is a view similar to Fig. 1, but showing still another embodiment;

Fig. 8 is an enlarged perspective view showing certain of the parts of Fig. 7;

Fig. 9 is a vertical section taken on the line 9—9 of Fig. 7;

Fig. 10 is a view similar to Fig. 1, but showing still another embodiment;

Fig. 11 is a front elevation of the parts shown in Fig. 10;

Fig. 12 is an enlarged vertical section taken substantially on the line 12—12 of Fig. 10;

Fig. 13 is an enlarged detail, being a vertical section taken on the line 13—13 of Fig. 10;

Fig. 14 is a view similar to Fig. 1, but showing still another embodiment;

Fig. 15 is a vertical section, taken substantially on the line 15—15 of Fig. 14;

Fig. 16 is an enlarged detail, being a vertical section taken substantially on the line 16—16 of Fig. 14;

Fig. 17 is a view similar to Fig. 16, but taken on the line 17—17 of Fig. 14; and Fig. 18 is a view similar to Fig. 15, taken substantially on the line 18—18 of Fig. 14 and partially broken away and partially additionally in section.

Similar reference characters refer to similar parts throughout the several views of the drawings.

The invention has been shown in these drawings as embodied in front-bumper designs; but it will be understood that the invention may be employed in connection with rear bumpers as well.

Referring now in detail to the bumper shown in Figs. 1 and 2, the same includes an impact band 20 of heavy spring steel and behind the same a similar band 21; these two bands at the front-center of the bumper being coupled by a fitment comprising a clamp 22 in the present case carrying a plurality of rollers 22a, and at their opposite ends being curled around bolts 23 and 23'. While as shown the bands 20 and 21 are differentially curved or shaped along their lengths between bolts 23 and 23', their said lengths are substantially equal. Bands 24 and 25 are complementary to the bands 20 and 21, inasmuch as these bands 24 and 25, hereinafter called the follow-up bands, form, with the bands 20 and 21 (hereinafter for convenience both called the impact bands), opposite sides of substantially an ellipse, and these sides are to approach each other and straighten out and thereby elongate the ellipse during shock absorption by the bumper following a severe impact frontally or substantially frontally received thereby. In other words, what may be called a toggle or quasi-toggle motion occurs, by virtue of other structural details as follows: The follow-up bands 24 and 25 are at their opposite ends curled around bolts 25 and 25', and these bolts, together with the bolts 23 and 23', tie together end-fitments 26 and 26'. Downward inward projections 26a and 26a' from these fitments restrain the latter against rocking relative to any of their bolts by being riveted at 27a and 27a' to the outer ends of a pair of rather stiff leaf-spring supports 28 and 28'; which supports are secured at their inner ends to fixed points on the vehicle. Moreover, in the present case, there is very little rockability in the fitments 26 and 26' relative to the impact and follow-up bands; due to the curlings of the latter bands around the bolts 25 and 25', and due to the curlings not only of the impact bands but also of the opposite end-portions of a shock-absorbing band 29 around the bolts 23 and 23'.

This shock-absorbing band 29 is shown as adapted to act shock-absorbingly by distention, and mainly lengthwisely of the bumper according to the invention, due to its forcible distention when the ellipse aforesaid is flattened and elongated due to an impact of the kind last above referred to. As here shown, the band 29 is a bar of metal, say cold-rolled steel or some other suitable material, given serpentine bends between its anchored ends; the material selected being desirably such that severe pulling stress on the bar deforms the same substantially or wholly permanently, to avoid or minimize rebound, and consequently actually to absorb, rather than to receive and elastically throw back, the shock transmitted thereto.

In order, however, to provide an elastic shock receptor as an actor within the bumper performing preliminarily to the permanent deformation just referred to, means are incorporated thus to function elastically. This is a preferred feature of the invention; it being useful to avoid really unrequired deformation of the band 29 or an equivalent on each slight impact received by the bumper, and in any case to cushion to some extent the shock absorption by permanent deformation. Whenever the band 29 or an equivalent is permanently deformed, unnecessarily, there is an unnecessary expense involved in reshaping the band or in removing the same and substituting another; although it will be noted that as the bumper is shown there will be very little or no trouble and hence little or no expense for the labor of substituting a new band for another, as the band ends are curled over rather than under the curled ends of the impact bands 20 and 21.

These elastically acting means are, in the present case, plurally present. In the first place, before the band 29 is permanently deformed by distention, the leaf-spring supports 28 and 28' yield elastically; the inner ends of these being here shown as riveted to sleevelike mounts 29 and 29' set-screwed on the car's front axle 30; these mounts being here shown as including forward curved-face extensions 29a and 29a' the purpose of which will be explained in a moment.

to deformation, then by an element of greater resistance to deformation. There is, again, shock-absorption substantially lengthwisely of the bumper—here, however, accompanied by bodily movement of one bumper element relative to another lengthwisely of the bumper, rather than by distention of the bumper as a whole lengthwisely as in Fig. 1.

Referring next to the embodiment of the invention illustrated in Figs. 7, 8, and 9, here an impact band 45, like the impact band 20 of Fig. 1, has its opposite ends curled around mounting posts. Here these posts are marked 46, and are carried by end fitments 47. These fitments, however, are functionally as well as structurally different from the fitments 26 and 26' of Fig. 1. These fitments 47 are plural-bar links pivotally connected at their outer ends by way of posts 46 with impact band 45, and are similarly connected at their inner ends, by pins 48, with a rigid bar 49. In other words, instead of avoiding a parallelogram of levers as in Fig. 1, here such a parallelogram is provided.

Bar 49 is adapted to be secured to the front axle of the vehicle by clamps 50.

Impact band 45 as shown has riveted thereto leaf-spring auxiliaries 51 for first receiving shocks directed obliquely against the bumper or endwisely thereof.

The parts so far described are normally held in their illustrated locations by means of a pair of shock-absorbing bands 52 each of the same general form and character as the band 29 of Fig. 1; each of said bands 52 being stretched between a hook 53 near the outer end of a link 47 and a hook 54 on the near side of a slide-sleeve 55 on a post 56 anchored at 57 on bar 49. The outer end of said slide-sleeve is shown as extended laterally of the bumper and as having riveted on such extension as indicated an M-shaped leaf-spring 58.

Desirably, there is a lost-motion means associated in some suitable way with each shock-absorbing band 52, for instance, a coil-spring addendum as indicated at 59. This permits elastic flattening out or undulatory deformation of the impact band 45 and of the M-spring 58, as a complete shock-absorption means for the frequent but slight shocks received by the bumper. These parts 45 and 58 also act as a first or preliminary such means before non-elastic shock absorption by deformation of one or both the shock-absorbing bands 52 in the case of a severe shock.

In the case of such a severe shock received frontally or substantially frontally of the bumper, slide-sleeve 55 will be forced along post 56 back toward the vehicle, thereby to cause both shock-absorbing bands 52 to come into action by distention; the links 47 not being allowed to rock toward bar 49 before the coming into action of other and more resistant shock-absorber means which absorb shock by permanent deformation.

Means of the kind last-mentioned are here shown at 60, one such means being at each rear corner of the bumper. Each of these means as shown comprises a pair of fan-ruffled or radially corrugated metal sheets of generally triangular cutline and made of some relatively inelastic material as cold rolled steel. These sheets are secured in place and connected with links 47 and bar 49 as illustrated, desirably by bolts 61, so that when the sheets are deformed by shock absorption they can be readily removed and others substituted.

Exceedingly severe shocks received obliquely or endwisely of the bumper will similarly be absorbed, first by the elastic impact band 45 and one of its elastic auxiliaries 51, and next by permanent deformation of the sheets 60, as the links 47 both swing to the right or left in the direction of shock reception. Such swinging of these links not only distends one band 52, but also, while one of the pair of sheets 60 is being distended the other pair of said sheets is being crushed.

Thus, in the embodiment of the invention just described in connection with Figs. 7, 8, and 9, also, there is shock absorption according to the invention and the hereinbefore stated present preferences. For example, there is shock absorption as the result of elastic yield, and also as the result of non-elastic yield. There is, further, progressive shock absorption, first by an element of less resistance to deformation, then by an element of greater resistance to deformation. There is, again, shock absorption substantially lengthwisely of the bumper—here accompanied by a bodily movement of one bumper element relative to another lengthwisely of the bumper, as in Fig. 3, and also, a distention of the bumper as a whole lengthwisely, as in Fig. 1.

Referring next to the embodiment of the invention illustrated in Figs. 10, 11, 12, and 13, here a pair of impact bands 62 are coupled with a single follow-up band 63 by end-curlings of these three bands over suitable posts 64a of end fitments 64; thus providing an elliptical structure similar in principle to the one included in the bumper of Fig. 1. In the present case, the impact bands 62, both similar and of uniform width from end to end, and one spaced above the other, have their ends curled about the upper and lower portions of the posts 64a; and the follow-up band 63, while throughout its main central length wider than an impact band 62, is narrower at its end portions so that these end portions may be curled around the middles of the posts 64a between the end-curlings thereof the two impact bands 62.

Follow-up band 63 is shown as secured at its middle to a platelike head 65a formed on a rearwardly extending rod 65 to provide one form of attachment of the bumper to the vehicle.

Also around said posts 64a, over the curlings of the end-portions of the follow-up band 63 therearound, are the curled ends of a pair of short hanger-bands 66 to the free ends of which are connected, by pin-and-slot lost-motion means the pin elements whereof are indicated at 67, the opposite ends of a shock-absorbing band 68 of the same general form and character as the band 29 of Fig. 1. Such lost-motion means is desirable to allow of initial elastic shock absorption, by impact bands 62, before permanent deformation of band 68 incident to a non-elastic shock-absorption thereby.

As shock-transmitters to the parts just described, there are provided a pair of comparatively stiff and heavy specially curved bar buffers 69 and 70 having buffer portions proper projected ahead of, and alongside the end-portions of, the impact bands 62. As these parts are shown buffer 69 is from end to end a round rod of a diameter to extend through the space between upper and lower impact bands 62; while buffer 70 is similarly constructed except that at a suitable point along the length of the latter it incorporates a horizontally elongated eye 70a through which can play the buffer 69. At its inner end each buffer carries an S-shaped head 69' or 70'; each such head at one end being fitted against and welded to the Also, as here shown, the two follow-up bands 24 and 25 at the rear-center of the bumper are coupled by a roller-equipped fitment 31a in a manner similar to the coupling of the impact bands 20 and 21 by the fitment 22. This fitment 31a is a part of a plunger 31, and said plunger works against an expansile spring 32 while guided in a slide-bore within a forwardly extending sleeve 33a forming part of a mount 33 set-screwed in fixed position on axle 30;—the compression of the spring 32 thus occurring simultaneously with the elastic yield of supports 28 and 28' as a preliminary to deformation of band 29. In the second place, means are present to cause elastic yield of spring elements coincidently with distention-deformation of band 29; these means being the differential shapings as between the bands 20 and 21 and as between the bands 24 and 25—the more elaborately curved bands 21 and 24 having to be stretched to the simpler curvatures of the bands 20 and 25 to become equal in length with the latter, incident to the first flattening of the ellipse.

Thus in the embodiment of the invention just described, there is not only, as is preferred, a progressive shock absorption on severe impact, with the shock-absorbing elements of greater resistivity to deformation subsequent in action to other such elements, but, also, principal shock absorption lengthwise rather than depthwise of the bumper; and, further, as may be found preferable, with one of said elements elastically yieldable and another substantially or completely non-elastically yieldable. Also, pursuant to one way of carrying out the invention, shock absorption occurs incident to elongation of the bumper substantially as a whole and to shifting of a bumper part in the direction of bumper length.

Referring next to the embodiment of the invention illustrated in Figs. 3, 4, 5, and 6, here an impact band is in the form of an arched member 33 U-shaped in cross-section as shown best in Fig. 4, carrying a pair of leaf-spring auxiliaries 34 compressible by obliquely or sidewardly received shocks. Impact band 33 is part of a unitary structure having plane bent end extensions which at 33a curl back toward the vehicle and thence continue at 33b inwardly toward each other in mutual alignment. Leaf-springs 34 are riveted near their rearward ends to these extensions 33b as shown.

Said extensions 33b are also U-shaped in cross-section, having top and bottom forwardly directed walls 33c; these walls slidably accommodating between them similar walls 35a at opposite ends of a heavy bar 35.

Said bar 35 at its center is suitably connected to the front of the vehicle by a rod 36 and an interposed plate 37.

The unitary structure including impact band 33 is always held on and forwardly projecting from bar 35, not only by the described relation of walls 33c and 35a, but also by the interfitting, within the rear channel 33' of impact band 33, of the free ends of a plurality of leftwardly curved swing-arms 38, 39 and 40 and rightwardly curved swing-arms 38', 39' and 40'.

Each of these swing-arms is pivotally carried on one of the six mountings 35d, each of fork-type as indicated in Fig. 4, and all carried by bar 35. By means of hooks fastened on the swing-arms as shown, and other hooks on all of the mountings 35d except the two at the extreme right and left, heavy retractile coil springs 41 connect arm 38 to the mounting for arm 39 and connect arm 39 to the mounting for arm 40, and similar springs 41' connect arm 38' to the mounting for arm 39' and connect arm 39' to the mounting for arm 40', and a similar spring connects arms 40 and 40'. These springs act on the swing-arms to hold the free ends of the latter within said channel 33' at all times.

As shown arms 40 and 40', by means of hooks thereon fairly close to impact band 33, are also joined by a shock-absorbing band 43 of the same general form and character as the band 29 of Fig. 1—except that the band 43 at each opposite end has a slot 43' therein as shown in Fig. 6. Such slots afford lost-motion means to avoid permanently deforming the band 43 for shock absorption purposes on slight rockings of the swing arms incident to other than severe impacts against the impact band 33 or transmitted thereto from an auxiliary 34 following or incident to some resilient deformation of the latter.

In order, among other things, normally to hold the impact band 33 centrally of the bar 35 laterally of the vehicle, each extension 33b of the unitary structure including said impact band carries a rearwardly extended hook 33d thereon, and bar 35 carries rearwardly projected a pair of posts 35e thereon; and between such a post and hook at opposite sides of the bumper there is stretched a shock-absorbing band 44 also of the same general form and character as the band 29 of Fig. 1.

On an impact against the bumper, the same if frontally or substantially frontally received will be taken up by a movement of the impact band 33, slightly preceded and/or accompanied by an elastic flexing of the auxiliary leaf-spring 34 to the left if the shock is received say in the direction of the arrow S of Fig. 3. If the shock-absorbing bands 44 are of high resistance to deformation, or if suitable lost-motion means are provided for said bands 44 (for instance, like the lost-motion means provided as in Fig. 6 for the shock-absorbing band 43), the impact band 33 may move toward bar 35 without deforming any of the shock-absorbing bands; such movement of the impact band 33 occurring by relative sliding between walls 35a and 33c and/or flexing of the extensions 33a of the unitary structure including the impact band. A movement of the impact band 33 toward bar 35 causes all or some of the swing-arms to rock back toward said bar, and thereby some or all of the shock of the impact being received is taken by stretching of the coil springs connected to the arms. If the shock is so severe that it or a part of it should be absorbed non-elastically, the shock-absorbing bands 43 and 44 next come into action, becoming distended substantially lengthwisely of the bumper. If the shock received by the bumper is from an impact arriving endwisely or substantially endwisely of the bumper, such shock, as to that part of it not absorbed elastically by the auxiliary leaf-spring 34, which receives the shocks, will be taken up non-elastically by the shock-absorption band 44 on the other side of the bumper—this band deforming by distention accompanying a movement of the impact band 33 lengthwisely of the bumper.

Thus in the embodiment of the invention just described in connection with Figs. 3 to 6, there is shock absorption according to the invention and the hereinbefore stated present preferences. For example, there is shock-absorption as the result of elastic yield, and also as the result of non-elastic yield. There is, further, progressive shock-absorption first by an element of less resistance shock-absorbing band 68 and at its other end presenting a hook to which is connected one end of a retractile coil spring 71. The other end of each such spring 71 is connected to a hook 69'' or 70'' on buffer 69 or 70.

These springs always hold rollers 72, on hangers 73 on buffers 69 and 70, against the front faces of upper and lower impact bands 62.

Any really severe impact against such a bumper, whether received frontally, obliquely or endwisely of the bumper, is received and absorbed by deformation of the shock-absorbing band 68. For instance, if received in the direction of the arrow S' of Fig. 10, buffer 69 will act entirely or substantially entirely as a thrust-rod, moving to the right and substantially parallel with the band 68, thus deforming the latter by distention over the greater part of its length. If the shock is received say in the direction of the arrow S'' of Fig. 10, there is action of buffer 69 as just described; plus a distention of the elliptical structure 62—63 lengthwisely of the bumper, and consequently a further deformation by distention of the band 68 over its whole length, as the result of the roller 72 on buffer 69 being forced against impact bands 62. Any frontal or substantially frontal shock will usually be first received by both buffers 69 and 70, or perhaps in part first received directly by impact bands 62; but always, either wholly through both rollers 72 or otherwise, to distend the elliptical structure 62—63 lengthwisely of the bumper by flattening pressure on the impact bands 62.

Thus in the embodiment of the invention just described in connection with Figs. 10, 11, 12, and 13, also, there is shock absorption according to the invention and the hereinbefore stated present preferences. For example, there is, at least as to impacts received in certain more usual directions, shock absorption as the result of elastic yield, and also as the result of non-elastic yield (due to the lost-motion means 67). There is, further, at least as to the impacts last referred to, progressive shock absorption, first by an element of less resistance to deformation, then by an element of greater resistance to deformation. There is, again, shock absorption substantially lengthwisely of the bumper—here accompanied, in the case of some impacts, by a bodily movement of one bumper element relative to another lengthwisely of the bumper, as in Figs. 3 and 7, or, in the case of other impacts, by a distention of the bumper as a whole lengthwisely, as in Fig. 1.

Referring next to the embodiment of the invention illustrated in Figs. 14, 15, 16, 17, and 18, here an impact band 74 is carried forwardly of a bumper structure more of the true-toggle type than even that form of the invention shown in Fig. 7. As shown, said impact band 74 is arched forwardly at its central portion and has terminal portions more sharply arcuate; these last-mentioned portions being impositively held between pairs of posts 75, one such pair within the forward forked end 76a of each of a pair of forwardly diverged arms 76.

Around each rearward post of the two pairs of posts 75 is curled one of the two opposite ends of a bar 77 which between such curlings is U-shaped in cross-section.

Along such U-shaped portion of the bar 77 are spaced pin-and-slot mountings 77a for the forward ends of pairs of links A and A', B and B' and C and C' constituting independent toggle-pairs. Each of these six links at its rear end is equipped with a roller, certain of which rollers ride in a track at a higher level and certain of which ride in a track at a lower level at the back of the bumper structure, so that in flattening out the toggle-pairs depthwisely of the bumper those of these rollers which move in one direction lengthwisely of the bumper will not interfere with the others of these rollers which then move in the opposite direction. The rollers on the rear ends of the links A, A' and C' move in the lower or bottom track and hence are marked respectively $Ab$, $A'b$ and $C'b$, and the rollers on the rear ends of the links B, B' and C move in the upper or top track and hence are marked $Bt$, $B't$ and $Ct$.

Said upper and lower roller tracks are provided at the portions marked T and B in Figs. 16, 17 and 18, with a C-shaped cover-structure $tb$ for a channel member 78 constituting a rigid and massive backing for the bumper and by way of which the bumper, through a rearwardly extending rod 79 secured to said backing, is suitably attached to the vehicle.

The arms 76 at their rear ends are pivotally connected at 80 to short thrust-studs 81; the rounded exterior of each such pivotal mounting resting up against a forwardly extended projection 82 in channel bar 78. These projections are at opposite ends of said channel bar, and between the thrust-studs 81 and secured thereto at its opposite ends is a shock-absorbing tube 83 of a circumferentially parallelly corrugated type but of an inelastically or substantially inelastically deformable metal or other material, as lead-coated steel, inelastic bronze or the like. The rear vertical wall of cover structure $tb$, which throughout the major part of the length of the tube 83 completes a tunnel or fully girthing box or sleeve for said tube, is, at each end thereof, and for a distance such as that indicated in Fig. 18, cut away to provide a slot $tb'$. These slots are to permit a combined rocking and sliding of arms 76 to cause the tube 83 to be endwisely crushed as the final and shock absorbing action of the bumper in the case of a very severe impact; the tube 83 being more resistant to deformation by such crushing than are other shock-absorbing elements so acting by distention following straightening out of the toggle-pairs A and A', B and B' and C and C'.

The shock-absorbing elements last referred to are shock-absorbing bands AA', BB' and CC' each similar in form and character to the band 29 of Fig. 1; the band AA' being stretched as illustrated between links A and A', the band BB' being stretched as illustrated between links B and B', and the band CC' being stretched as illustrated between links C and C'.

In the case of a frontal or oblique impact against the bumper, there is first an elastic shock absorption by a straightening out of the impact band 74, and then a non-elastic shock-absorption by distention-deformation of one or more of the bands AA', BB' and CC', and finally, where the shock is very severe, a non-elastic shock-absorption by crushing-deformation of the tube 83 resulting from a movement of one or both of the arms 76 as above described; while in the case of an impact received endwisely of the bumper there is an absorption thereof, chiefly by crushing-deformation of said tube, due to the arm 76 on the side of the bumper which receives the shock acting as a thrust-rod, and partially, in practically every case, by an accompanying distention of one or more of the bands AA', BB' and CC'.

Thus, in the embodiment of the invention just described in connection with Figs. 14, 15, 16, 17, and 18, there is shock absorption according to the invention and the hereinabove stated present preferences. For example, there is, at least as to impacts received in certain more usual directions, shock absorption as the result of elastic yield and also as the result of non-elastic yield. There is, further, as to all impacts received, differential and/or progressive shock absorption, part thereof by an element of less resistance to deformation and part thereof by an element of greater resistance to deformation. There is, again, shock absorption principally lengthwisely of the bumper, performed or assisted by a toggle action—here, however, as the result of including a true or pivoted-toggle component. Also, in this embodiment, another possibility of the invention is illustrated, which is the pluralizing of toggle-components in a way to give shock-absorption lengthwisely of the bumper over an effective linear path which is a multiple of the lengthwise distendability of the main bumper structure, whether as the result of a quasi-toggle as in Figs. 1 and 10, a duplex-quasi-toggle because a parallelogram of levers as in Fig. 7, or what may be termed a camming action and/or a rotation of swing-arms as in Fig. 3. Finally, the shock-absorption here is accomplished, in the case of some if not all impacts, both by a bodily movement of a bumper part relative to another and by a distention of the bumper as a whole lengthwisely thereof.

Included within the invention are parts only of, and combinations of parts from, one or more of the illustrated embodiments or variations thereof within the broad principle of the invention. As one of many possible examples, a bumper according to the invention could be constructed as in Fig. 14, but with only the parts 76—77—83 or equivalents present, or with the last-mentioned parts absent. And inasmuch as many apparently widely different embodiments of the invention from those illustrated are possible, it is intended that all matter contained in the above description or shown in the accompanying drawings is to be taken as illustrative merely and not in a limiting sense. The scope of protection contemplated is to be taken from the appended claims, interpreted as broadly, in the light of the foregoing specification and otherwise, as is consistent with the prior art.

What is claimed as new, is:

1. In an automobile bumper of a greater length widthwisely of the automobile than depthwisely in the direction of travel thereof, the combination of an impact element, a carrying structure therefor including mounting means for the impact element, said mounting means including pivots joining the impact element and said carrying structure whereby during shock-absorption the length of the bumper is increased, and shock-absorbing means functioning, during such lengthening of the bumper, shock-absorbingly in a direction more lengthwise of the bumper than depthwise thereof while absorbing the major portion of that part of a shock received by said element and unabsorbed by the latter and its mounting means.

2. In an automobile bumper of a greater length widthwisely of the automobile than depthwisely in the direction of travel thereof, the combination of a structure distensible lengthwisely of the bumper during shock absorption and including a plurality of bumper parts one of which is an impact element and another of which is a secondary bumper part in rear of said bumper element, mounting means including pivots joining said bumper parts whereby said parts move relatively during shock-absorption to increase the length of the bumper, and shock-absorbing means subtantially non-elastically deformable on such distention of said structure.

3. The bumper defined in claim 2, wherein said structure is substantially elliptical with the longitudinal axis thereof running along the length of the bumper.

4. In an automobile bumper of a greater length widthwisely of the automobile than depthwisely in the direction of travel thereof, the combination of a structure distensible lengthwisely of the bumper during shock absorption and including a plurality of bumper parts, mounting means including pivots joining said bumper parts whereby said parts move relatively during shock-absorption to increase the length of the bumper, one of said parts being an impact element acting first as an elastically deformable shock-absorbing instrumentality and a second of said parts acting as a non-elastically deformable shock-absorbing instrumentality, and means for bringing said second part into action to become deformed by absorbing excess shock unabsorbed by said impact element.

5. The bumper defined in claim 4, wherein there is as one of said relatively movable parts a third part also acting shock-absorbingly by non-elastic deformation, this last-mentioned part being of greater resistance to deformation than said second part.

6. The bumper defined in claim 4, wherein said second part is deformed to act shock-absorbingly in a direction which is more lengthwise than depthwise of the bumper.

7. The bumper defined in claim 4, wherein there is as one of said relatively movable parts a third part also acting shock-absorbingly by non-elastic deformation, this last-mentioned part being of greater resistance to deformation than said second part, said second and third parts being both deformed to act shock-absorbingly in a direction which is more lengthwise than depthwise of the bumper.

8. In an automobile bumper of a greater length widthwisely of the automobile than depthwisely in the direction of travel thereof, the combination of a quasi-toggle including an impact element for the bumper, a backing element for the bumper and mechanical connections including pivots between said two elements, such toggle being spreadable lengthwisely of the bumper by impact against the bumper received at an angle to its length, and shock-absorbing means permanently deformable by such toggle spread substantially in the direction of such toggle spread.

9. In an automobile bumper of a greater length widthwisely of the automobile than depthwisely in the direction of travel thereof, the combination of a toggle including an impact element for the bumper, a backing element for the bumper and mechanical connections including pivots between said two elements, such toggle being spreadable lengthwisely of the bumper by impact against the bumper received at an angle to its length, and shock-absorbing means permanently deformable by such toggle spread substantially in the direction of toggle spread.

10. The bumper defined in claim 1, wherein said shock-absorbing means includes an element acting shock-absorbingly by substantially non-elastic deformation.

11. The bumper defined in claim 1, wherein said shock-absorbing means includes a plurality of shock-absorbing elements, and means for causing one such element to act first and the other next, both acting shock-absorbingly by substantially non-elastic deformation.

12. The bumper defined in claim 1, wherein said shock-absorbing means includes a plurality of shock-absorbing elements, and means for causing one such element to act first and the other next, both acting shock-absorbingly by substantially non-elastic deformation, the one acting first being of less resistance to deformation than the one later acting.

13. The bumper defined in claim 1, wherein said shock-absorbing means includes a plurality of shock-absorbing elements one acting shock-absorbingly by elastic deformation and another acting shock-absorbingly by substantially non-elastic deformation.

14. The bumper defined in claim 2, wherein said pivot carrying means includes a link.

15. The bumper defined in claim 2, wherein said movable parts include a pair of toggle-links.

16. The bumper defined in claim 2, wherein said movable parts include a parallelogram of levers.

17. The bumper defined in claim 2, wherein one of said movable parts is a part bodily movable relative to another part.

18. The bumper defined in claim 2, wherein one of said movable parts is a part movable more lengthwisely than depthwisely of the bumper.

19. The bumper defined in claim 2, whereon one of said movable parts is a part movable lengthwisely of the bumper.

20. The bumper defined in claim 1, wherein said shock-absorbing means includes a plurality of shock-absorbing elements one acting first and the other acting next, both acting shock-absorbingly by substantially non-elastic deformation, one of such deformations being by distention and the other being by crushing.

21. In an automobile bumper of greater length widthwisely of the automobile than depthwisely in the direction of travel thereof, the combination of an impact element, a carrying structure therefor, means for maintaining said element on said structure while permitting movement of said element relative to said structure whereby during shock absorption the bumper is distended lengthwisely, shock-absorbing means including a shock-absorbing element substantially non-elastically deformable, and means operated by such distention for causing such deformation when said distention results from the receipt by such element of a shock of a predetermined degree of severity.

22. The bumper defined in claim 21, wherein said shock-absorbing means includes another shock-absorbing element also substantially non-elastically deformable but of greater resistance to deformation, and means are provided to cause deformation of the last mentioned element as the result of a receipt by the impact element of a shock of a greater degree of severity.

23. The bumper defined in claim 21, wherein said shock-absorbing means includes a shock-absorbing element elastically deformable, and means are provided to cause deformation of the last mentioned element as the result of a receipt by the impact element of a shock of a degree of severity insufficient to deform the first mentioned shock-absorbing element.

IVAN WOLFF.